United States Patent
Liu et al.

(10) Patent No.: US 10,082,900 B2
(45) Date of Patent: Sep. 25, 2018

(54) DISPLAY DEVICE AND METHOD FOR DRIVING THE SAME

(71) Applicants: BOE TECHNOLOGY GROUP CO., LTD., Beijing (CN); CHENGDU BOE OPTOELECTRONICS TECHNOLOGY CO., LTD., Chengdu, Sichuan (CN)

(72) Inventors: Haodi Liu, Beijing (CN); Benyin Ye, Beijing (CN); Zihe Zhang, Beijing (CN); Liang Li, Beijing (CN)

(73) Assignees: BOE TECHNOLOGY GROUP CO., LTD., Beijing (CN); CHENGDU BOE OPTOELECTRONICS TECHNOLOGY CO., LTD., Chengdu (CN)

( * ) Notice: Subject to any disclaimer, the term of this patent is extended or adjusted under 35 U.S.C. 154(b) by 219 days.

(21) Appl. No.: 14/771,741

(22) PCT Filed: Apr. 14, 2015

(86) PCT No.: PCT/CN2015/076520
§ 371 (c)(1),
(2) Date: Aug. 31, 2015

(87) PCT Pub. No.: WO2016/058342
PCT Pub. Date: Apr. 21, 2016

(65) Prior Publication Data
US 2016/0299618 A1    Oct. 13, 2016

(30) Foreign Application Priority Data

Oct. 15, 2014   (CN) .......................... 2014 1 0546495

(51) Int. Cl.
*G06F 3/041*   (2006.01)
*G06F 3/044*   (2006.01)
(Continued)

(52) U.S. Cl.
CPC ........ *G06F 3/0416* (2013.01); *G02F 1/13338* (2013.01); *G06F 3/044* (2013.01);
(Continued)

(58) Field of Classification Search
CPC ....................................................... G06F 3/041
See application file for complete search history.

(56) References Cited

U.S. PATENT DOCUMENTS

| 2011/0199335 | A1 | 8/2011 | Li et al. | |
|---|---|---|---|---|
| 2012/0038585 | A1* | 2/2012 | Kim ...................... | G06F 3/0412 345/174 |

(Continued)

FOREIGN PATENT DOCUMENTS

| CN | 101833939 A | 9/2010 |
|---|---|---|
| CN | 101833939 B1 * | 3/2012 |

(Continued)

OTHER PUBLICATIONS

Written Opinion of the International Searching Authority for international application No. PCT/CN2015/076520.
(Continued)

*Primary Examiner* — Cory Almeida
(74) *Attorney, Agent, or Firm* — Harness, Dickey & Pierce, P.L.C.

(57) ABSTRACT

A display device and a method for driving the same are provided by the present disclosure. The display device includes a display panel and a touch panel. The method includes: applying a horizontal synchronizing signal to a plurality of scanning lines of the display panel; and applying a touch driving signal to a plurality of touch driving signal lines of the touch panel; an orthographic projection of the scanning line receiving the horizontal synchronizing signal onto the display panel does not overlap an orthographic projection of the touch driving signal line receiving the (Continued)

touch driving signal onto the display panel at least within a predetermined time period.

17 Claims, 3 Drawing Sheets

(51) Int. Cl.
    *G02F 1/1333* (2006.01)
    *G09G 3/36* (2006.01)
    *G09G 3/20* (2006.01)

(52) U.S. Cl.
    CPC .......... *G06F 3/0412* (2013.01); *G06F 3/0418* (2013.01); *G09G 3/20* (2013.01); *G09G 3/3677* (2013.01); *G09G 3/3688* (2013.01); *G06F 2203/04103* (2013.01); *G09G 2310/0202* (2013.01)

(56) References Cited

U.S. PATENT DOCUMENTS

| | | | | |
|---|---|---|---|---|
| 2013/0293511 | A1* | 11/2013 | Nam | G06F 3/0418 345/174 |
| 2014/0111442 | A1* | 4/2014 | Cok | G06F 3/044 345/173 |
| 2014/0168151 | A1 | 6/2014 | Noguchi et al. | |
| 2014/0176497 | A1 | 6/2014 | Mo et al. | |
| 2014/0210791 | A1 | 7/2014 | Hanauer et al. | |
| 2015/0193041 | A1* | 7/2015 | Shepelev | G06F 3/044 345/174 |

FOREIGN PATENT DOCUMENTS

| | | |
|---|---|---|
| CN | 102830837 A | 12/2012 |
| CN | 102929460 A | 2/2013 |
| CN | 103186308 A | 7/2013 |
| CN | 103389842 A | 11/2013 |
| CN | 103885223 A | 6/2014 |
| CN | 103927048 A | 7/2014 |
| CN | 104317446 A | 1/2015 |
| KR | 20140018389 A | 2/2014 |

OTHER PUBLICATIONS

Notice of Preliminary Rejection for Korean Patent Application No. 10-2015-7023474, dated Sep. 28, 2015.
First Office Action regarding Chinese application No. 201410546495.8, dated Nov. 4, 2016. Translation provided by Dragon Intellectual Property Law Firm.
Notice of Preliminary Rejection for Korean Patent Application No. 10-2015-7023474, dated Jan. 10, 2017. Translation provided by Dragon Intellectual Property Law Firm.
Notice of Preliminary Rejection for Korean Patent Application No. 10-2015-7023474, dated Aug. 28, 2015. Translation provided by Dragon Intellectual Property Law Firm.
Second Office Action regarding Chinese Application No. 201410546495.8, dated May 24, 2017. Translation provided by Dragon Intellectual Property Law Firm.
Supplementary European Search Report regarding Application No. EP 15 75 3301 dated Jul. 3, 2018.

* cited by examiner

DISPLAY DEVICE AND METHOD FOR DRIVING THE SAME

CROSS-REFERENCE TO RELATED APPLICATIONS

This application is the U.S. national phase of PCT Application No. PCT/CN2015/076520 filed on Apr. 14, 2015, which claims a priority to Chinese Patent Application No. 201410546495.8 filed on Oct. 15, 2014, the disclosures of which are incorporated in their entirety by reference herein.

TECHNICAL FIELD

The present disclosure relates to the field of display technology, and in particular to a display device and a method for driving the same.

BACKGROUND

Touch screens are most popular information input devices at present, which can realize human-machine interaction in a simple, convenient and natural way, and are new multimedia interaction devices. A capacitive touch screen has advantages such as a sensitive touch response and supporting of multi-point touch.

An integration of touching and displaying functions is a development tendency of the entire industry. An on-cell touch screen is light and thin, and a process thereof has fewer steps, which are sold in market from 2014, and a market shares thereof grows rapidly.

A touch sensing electrode of an existing integrated touch screen is located on a color filter substrate of a display panel, and then the touch sensing electrode of the integrated touch screen is too close to the display panel, thereby electrodes of the display panel (including scanning lines and data lines) may give large interference noise to the touch sensing electrode of the integrated touch screen. Since signal-noise ratio of the integrated touch screen is not high, thus, the integrated touch screen technology is delimited as a low level product in the touch field.

How to improve signal-noise ratio of an integrated touch screen has become a technical problem to be solved urgently in this field.

SUMMARY

The present disclosure is to provide a display device and a method for driving the same, and the display device may have a relative high signal-noise ratio when driven by the method.

To this end, a method for driving a display device is provided according to an aspect of the present disclosure. The display device includes a display panel and a touch panel, the method includes:

applying a horizontal synchronizing signal to a plurality of scanning lines of the display panel; and
applying a touch driving signal to a plurality of touch driving signal lines of the touch panel;
where an orthographic projection of the scanning line receiving the horizontal synchronizing signal onto the display panel does not overlap an orthographic projection of the touch driving signal line receiving the touch driving signal onto the display panel at least within a predetermined time period.

Optionally, the orthographic projection of the scanning line receiving the horizontal synchronizing signal onto the display panel does not overlap the orthographic projection of the touch driving signal line receiving the touch driving signal onto the display panel at any time.

Optionally, a frequency of the touch driving signal is greater than a frequency of the horizontal synchronizing signal.

Optionally, the step of applying the horizontal synchronizing signal to the plurality of scanning lines of the display panel and the step of applying the touch driving signal to the plurality of touch driving signal lines of the touch panel are performed simultaneously.

Optionally, the method further includes:

stopping the step of applying the horizontal synchronizing signal to the plurality of scanning lines of the display panel, and stopping the step of applying the touch driving signal to the plurality of touch driving signal lines of the touch panel at a predetermined time point before completion of displaying of one frame of image; and
monitoring noise of the display panel.

Optionally, the method further includes:

adjusting a burst frequency of the touch driving signal based on the noise of the display panel obtained in the step of monitoring the noise of the display panel, until the touch driving signal avoids the noise.

Optionally, the method includes scanning the touch driving signal lines from an $N^{th}$ row to a last row of the touch driving signal line, and then scanning the touch driving signal lines from a first row to an $(N-1)^{th}$ row of the touch driving signal line, where N is greater than 1.

Optionally, the method further includes:

applying a vertical synchronizing signal to a plurality of data lines of the display panel when applying the horizontal synchronizing signal to a first scanning line of the display panel; and
applying a synchronization control signal to a touch panel driving circuit of the touch panel when applying the horizontal synchronizing signal to the first scanning line of the display panel;
where the touch driving signal is applied to the plurality of touch driving signal lines of the touch panel when the touch panel driving circuit of the touch panel receives the synchronization control signal.

A display device is provided according to another aspect of the present disclosure, including a display panel, a touch panel, a display panel driving circuit and a touch panel driving circuit. The display panel includes a plurality of scanning lines, the touch panel includes a plurality of touch driving signal lines, the display panel driving circuit includes a horizontal synchronizing signal generation module configured to apply a horizontal synchronizing signal to the plurality of scanning lines in sequence, and touch panel driving circuit includes a touch driving signal generation module configured to apply a touch driving signal to the plurality of touch driving signal lines.

The horizontal synchronizing signal provided by the display panel driving circuit and the touch driving signal provided by the touch panel driving circuit satisfy the following conditions: an orthographic projection of the scanning line receiving the horizontal synchronizing signal onto the display panel does not overlap an orthographic projection of the touch driving signal line receiving the touch driving signal onto the display panel at least within a predetermined time period.

Optionally, the horizontal synchronizing signal provided by the display panel driving circuit and the touch driving signal provided by the touch panel driving circuit further satisfy the following conditions: the orthographic projection of the scanning line receiving the horizontal synchronizing signal onto the display panel does not overlap the orthographic projection of the touch driving signal line receiving the touch driving signal onto the display panel at any time.

Optionally, a width of the touch driving signal line is an integral multiple of a pixel width of the display panel.

Optionally, the display panel includes a plurality of data lines, the display panel driving circuit further includes a vertical synchronizing signal generation module and a synchronizing control signal generation module. The vertical synchronizing signal generation module is configured to apply a vertical synchronizing signal to the data line, and the synchronizing control signal generation module is configured to apply, when displaying one frame of image, a synchronization control signal to the touch driving signal generation module of the touch panel driving circuit when the horizontal synchronizing signal generation module applies the horizontal synchronizing signal to a first scanning line. The touch driving signal generation module generates the touch driving signal when receiving the synchronization control signal.

Optionally, the horizontal synchronizing signal generation module stops applying the horizontal synchronizing signal to the plurality of scanning lines of the display panel at a predetermined time point before completion of displaying of the frame of image. The touch driving signal generation module stops applying the touch driving signal to the plurality of touch driving signal lines of the touch panel at the predetermined time point before completion of displaying of the frame of image. The touch panel further includes a noise monitoring module configured to monitor noise of the display panel.

Optionally, the touch panel driving circuit further includes a first feedback signal generation module. The first feedback signal generation module sends a first feedback signal to the display panel driving circuit when the touch panel driving circuit stops applying the touch driving signal to the plurality of touch driving signal lines. The display panel driving circuit stops outputting the horizontal synchronizing signal when the display panel driving circuit receives the first feedback signal.

Optionally, the noise monitoring module includes a touch sensing electrode, the touch panel driving circuit further includes a signal monitoring module, the touch sensing electrode is connected to the signal monitoring module, the touch sensing electrode and the touch driving signal line forms a capacitor, and the signal monitoring module is connected to the touch sensing electrode, to monitor variation of a signal output by the touch sensing electrode.

Optionally, the touch panel driving circuit further includes a burst frequency adjustment module. The burst frequency adjustment module receives a monitoring result obtained by the noise monitoring module, and the burst frequency adjustment module is configured to adjust a burst frequency of the touch driving signal until the touch driving signal avoids the noise.

Optionally, the touch panel driving circuit further includes a second feedback signal generation module. The second feedback signal generation module is configured to send a second feedback signal to the display panel driving circuit when displaying of the fame of image is completed, and the display panel driving circuit controls the horizontal synchronizing signal generation module to continue to send the horizontal synchronizing signal after the display panel driving circuit receives the second feedback signal.

When the display device displays images within the predetermined time period, the scanning line receiving the horizontal synchronizing signal HSYNC and the touch driving signal line receiving the touch driving signal Tx are staggered, so capacitive coupling may hardly be generated between them, thereby a signal-noise ratio of the touch panel within the predetermined time period may be improved.

BRIEF DESCRIPTION OF THE DRAWINGS

The drawings are a part of the description and are provided for a further understanding of the present disclosure. The following embodiments and the drawings are merely to illustrate the present disclosure rather than limit the scope thereof.

REFERENCES OF DRAWING REPRESENT

100: display panel
110: scanning line
120: data line
200: display panel driving circuit
210: horizontal synchronizing signal generation module
220: vertical synchronizing signal generation module
230: synchronizing control signal generation module
300: touch panel
310: touch driving signal line
320: touch sensing electrode
400: touch panel driving circuit
410: touch driving signal generation module
420: first feedback signal generation module
430: signal monitoring module
440: second feedback signal generation module
450: burst frequency adjustment module

DETAILED DESCRIPTION

The embodiments of the present disclosure will be described in conjunction with the drawings. It should be understood that, the embodiments described herein are merely to describe and illustrate the present disclosure rather than to limit the present disclosure.

Noise of an integrated display device in the related art is monitored by the inventor of the present disclosure. The display device includes a display panel and a touch panel arranged on the display panel. The display panel is a liquid crystal display panel, and the touch panel includes touch driving signal lines and touch sensing electrodes.

Each touch driving signal line and a corresponding touch sensing electrode may form a capacitor. When touch driving signals are applied to a plurality of touch driving signal lines in sequence, one touch driving signal line received the touch driving signal is coupled to a corresponding touch sensing electrode, and then raw data is generated in the touch sensing electrode.

Firstly, the raw data in the touch sensing electrode of the touch panel is monitored via apparatus by the inventor of the disclosure when the display panel is turned off. In this case, the touch sensing electrode of the touch panel may output normal raw data, i.e., the touch sensing electrode works normally. The raw data described herein refers to a signal output by the touch sensing electrode without a touching. Then, the raw data in the touch sensing electrode of the touch panel is monitored via the apparatus by the inventor of the disclosure when the display panel is turned on. In this case, a signal output by the touch sensing electrode is not be the raw data. A waveform of the signal output by the touch sensing electrode includes two parts: one part is periodical wave crests, the other part is stable signal appearing all the time. A signal value of the stable signal is different from a signal value of the raw data.

The inventor of the present disclosure found that, since the touch panel is arranged on the display panel, thus the touch driving signal lines on the touch panel cover the scanning lines on the display panel. When the display panel is turned on, when one touch driving signal line and one scanning line covered by the touch driving signal line receive signals simultaneously, a capacitive coupling (i.e., noise) may be generated between the scanning line and the corresponding touch driving signal line, thereby determination of a touch point may be influenced. A relative large coupled capacitance (the coupled capacitance is corresponding to the monitored periodical peaks) may be generated between the scanning line of the display panel and the touch driving signal line each time the scanning line of the display panel is scanned and refreshed, then, an electric signal of a touch driving electrode may be changed, and then an electric signal generated in the touch sensing electrode corresponded to the touch driving signal line may be changed.

In addition, the display panel has a liquid crystal capacitor when displaying. The liquid crystal capacitor may influence the touch driving signal line (i.e., the liquid crystal capacitor also changes the electric signal in the touch driving signal line), thereby the touch sensing electrode may output a signal value different from a signal value of the raw data.

To at least avoid influence of the coupled capacitance to the touch driving signal line when scanning and refreshing the scanning lines, a method for driving a display device is provided according to one aspect of the present disclosure. The display device includes a display panel and a touch panel arranged on the display panel. In other words, a method for driving a display device including an integrated touch panel is provided in the present disclosure. As described hereinabove, the display panel includes a plurality of scanning lines, and the touch panel includes a plurality of touch driving signal lines. To be specific, the method includes:

applying a horizontal synchronizing signal HSYNC to the plurality of scanning lines of the display panel;

applying a touch driving signal Tx to the plurality of touch driving signal lines of the touch panel;

where, at least within a predetermined time period, an orthographic projection of scanning lines receiving the horizontal synchronizing signal HSYNC onto the display panel does not overlap an orthographic projection of touch driving signal lines receiving the touch driving signal Tx onto the display panel.

According to the present disclosure, when an image is displayed by the display device within the predetermined time period, the orthographic projection of the scanning lines receiving the horizontal synchronizing signal HSYNC onto the display panel does not overlap the orthographic projection of the touch driving signal lines receiving the touch driving signal Tx onto the display panel, so positions of the scanning lines receiving the horizontal synchronizing signal HSYNC and positions of the touch driving signal lines receiving the touch driving signal Tx are staggered. Therefore, capacitive coupling may hardly be generated between the scanning lines receiving the horizontal synchronizing signal HSYNC and the touch driving signal lines receiving the touch driving signal Tx, and thus an electric signal in the touch driving signal lines may hardly be influenced, whereby a signal-noise ratio of the touch panel within the predetermined time period may be improved.

To improve the signal-noise ratio of the touch panel during an entire display process, optionally, at any time, the orthographic projection of the scanning lines receiving the horizontal synchronizing signal HSYNC onto the display panel does not overlap the orthographic projection of the touch driving signal lines receiving the touch driving signal Tx onto the display panel. That is, at any time when the display panel displays the image, the scanning lines receiving the horizontal synchronizing signal HSYNC and the touch driving signal lines receiving the touch driving signal Tx are staggered. Therefore, the coupled capacitance between the scanning lines and the touch driving signal lines is small at any time when displaying the image, thereby the signal-noise ratio of the touch panel may be high at any time when displaying the image.

The plurality of data lines and the plurality of scanning lines on the display panel divide the display panel into a plurality of pixel units which are arranged in multiple rows and columns. Each scanning line is corresponding to a row of pixel units. To save the manufacturing cost, a width of the touch driving signal line on the touch panel may be set such that the touch driving signal line may cover multiple rows of pixel units. For example, for a display device with a resolution of 1280×720, the width of the touch driving signal line may be set as 107 times of the width of the pixel unit. That is, one row of touch driving signal line may cover 107 rows of pixel units. Correspondingly, a pulse width of the touch driving signal Tx may be set as 107 times of a pulse width of the horizontal synchronizing signal HSYNC. The present disclosure is certainly not limited thereto, the width of the touch driving signal line may be any integral multiples of the width of pixel unit so long as a location of a touch point may be determined accurately.

Figure 1:
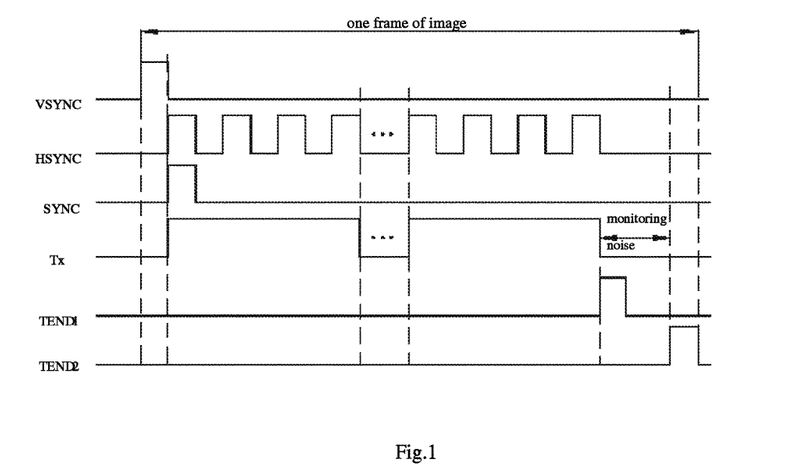
FIG. 1 is a diagram showing time sequences of each signal in a method for driving a display device provided in the present disclosure.

To guarantee that a touch signal is not distorted, optionally, a frequency of the touch driving signal Tx may be greater than a scanning frequency of the display panel, as shown in FIG. 1. Generally, the scanning frequency of the display panel is 60 Hz, and a scanning frequency of the touch driving signal Tx may be set as 120 Hz.

To facilitate the operation, optionally, the step of applying the horizontal synchronizing signal HSYNC to the plurality of scanning lines of the display panel and the step of applying the touch driving signal Tx to the plurality of touch driving signal lines of the touch panel are performed simultaneously, as shown in FIG. 1.

In the display device, not only the coupled capacitance between the scanning lines and the touch driving signal lines but also a liquid crystal capacitor in the display panel (not shown) may influence the touch panel. To reduce the influence on the touch panel caused by the liquid crystal capacitor in the display panel, optionally, the method for driving the display device may further include:

stopping the step of applying the horizontal synchronizing signal HSYNC to the plurality of scanning lines of the display panel and stopping the step of applying the touch driving signal Tx to the plurality of touch driving signal lines of the touch panel at a predetermined time point before completion of displaying of one frame of image; and monitoring noise of the display panel.

According to the method for driving the display device provided in the present disclosure, a time period for displaying one frame of image is divided into two parts: one is a time period for displaying, and the other is a time period for monitoring noise. During the time period for monitoring noise, only the noise generated by the liquid crystal capacitor is monitored with no image being displayed, whereby parameters such as frequency and magnitude of the noise generated by the liquid crystal capacitor may be obtained accurately. The method for monitoring noise is week known in this field, and the description thereof may be omitted herein.

After the noise of the display panel is monitored, the touch driving signal Tx may be adjusted by means of frequency hopping to avoid the noise. To be specific, a burst frequency of the touch driving signal Tx is adjusted based on the noise of the display panel obtained in the step of monitoring the noise of the display panel, until the touch driving signal Tx avoids the noise. That is, the burst frequency of the touch driving signal Tx may be adjusted to stagger from the noise signal, so that the noise may not influence the touch driving signal Tx in the touch driving signal line, thereby a touch sensing signal generated by a coupling between the touch sensing electrode and the touch driving signal line may not be influenced, and then a location coordinate of the touch point may be determined more steadily.

The steps hereinabove are merely for displaying one frame of image, which may be repeated when displaying a next frame of image.

In order to minimum the influence of the horizontal synchronizing signal HSYNC in the scanning line to the touch driving signal Tx, optionally, at a same time, the scanning line received the horizontal synchronizing signal HSYNC may be as far away as possible from the touch driving signal line received the touch driving signal Tx. Generally, the plurality of scanning lines of the display panel may be scanned one by one from a first row of the scanning line. Optionally, as shown in FIG. 2, the touch driving signal lines may be scanned from a $N^{th}$ row to a last row of the touch driving signal line, and then the scanning lines may be scanned from the first row to a $N-1^{th}$ row of the scanning line, where N is greater than 1.

Figure 2:
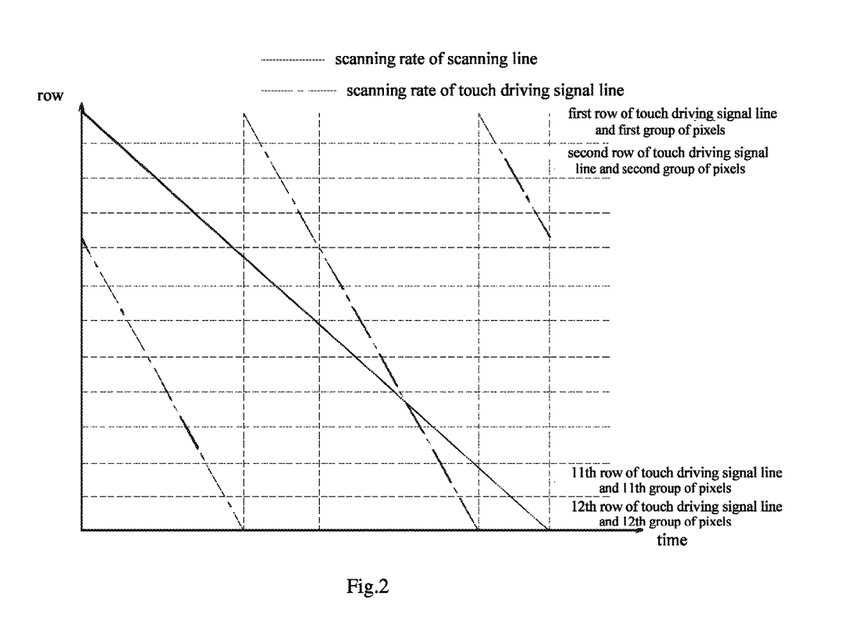
FIG. 2 is a schematic view showing a scanning duration in the method for driving the display device provided in the present disclosure.

FIG. 2 is a schematic view showing a scanning duration according to the method for driving the display device provided in the present disclosure. An oblique solid line in FIG. 2 represents that the horizontal synchronizing signal HSYNC scans the scanning lines by rows from a first group of pixels, a slope of the oblique solid line represents a scanning rate of the horizontal synchronizing signal HSYNC. A line divided by dots represents that the touch driving signal Tx scans the touch driving signal lines by rows, and a slope of the line divided by dots represents a scanning rate of the touch driving signal Tx.

As shown in FIG. 2, each row of the touch driving signal line is for example corresponding to 107 rows of pixels. The first group of pixels is a first row to a $107^{th}$ row of pixels, a second group of pixels is a $108^{th}$ row to a $214^{th}$ row of pixels, and so on, a $11^{th}$ group of pixels is a $1071^{st}$ row to the $1177^{th}$ row of pixels, and a $12^{th}$ group of pixels is a $1178^{th}$ row to a $1280^{th}$ row of pixels. It may be understood that, the number of the rows of the last group of pixels is lower than the number of the rows of the other group of pixels.

When the display panel scans from the first group of pixels, the touch panel may begin to scan from a fourth row of touch driving signal line to avoid a scanning of the display panel. However, when scanning to the $9^{th}$ row of touch driving signal line, if a sequence of scanning the touch driving signal lines is not changed, the $9^{th}$ row of the touch driving signal line may cover the pixels which are being scanned (i.e., covering the scanning line which is being scanned). Therefore, the $9^{th}$ row of the touch driving signal line is not scanned at this point, and a $10^{th}$ row of the touch driving signal line is scanned. After the scanning of the $10^{th}$ row of the touch driving signal line is completed, a regressed scanning may be performed on the $9^{th}$ row of the touch driving signal line. After the scanning of the $9^{th}$ row of the touch driving signal line is completed, a $11^{th}$ row of the touch driving signal line and a $12^{th}$ row of the touch driving signal line may be scanned in sequence, and then a first row of the touch driving signal line to a third row of the touch driving signal line may be scanned in sequence. To this point, all the touch driving signal lines may be scanned.

In addition, those skilled in the art may understand that, to realize a normal displaying of the display device, the method for driving the display device may further include applying a vertical synchronizing signal VSYNC to the data line of the display panel when applying the horizontal synchronizing signal HSYNC to a first scanning line of the display panel. The vertical synchronizing signal VSYNC is a pulse signal. Displaying of one frame of image is corresponding to one vertical synchronizing signal VSYNC.

To facilitate controlling time sequences of the horizontal synchronizing signal HSYNC and the touch driving signal Tx, optionally, the method for driving the display device further includes:

applying a synchronization control signal SYNC to a touch panel driving circuit of the touch panel when applying the horizontal synchronizing signal HSYNC to the first scanning line of the display panel;

where the touch driving signal Tx is applied to the plurality of touch driving signal lines of the touch panel when the touch panel driving circuit of the touch panel receives the synchronization control signal SYNC.

The presence of the synchronization control signal SYNC is to send the horizontal synchronizing signal HSYNC and the touch driving signal Tx simultaneously, so as to facilitate controlling the time sequences of the horizontal synchronizing signal HSYNC and the touch driving signal Tx in the subsequent steps.

Figure 3:
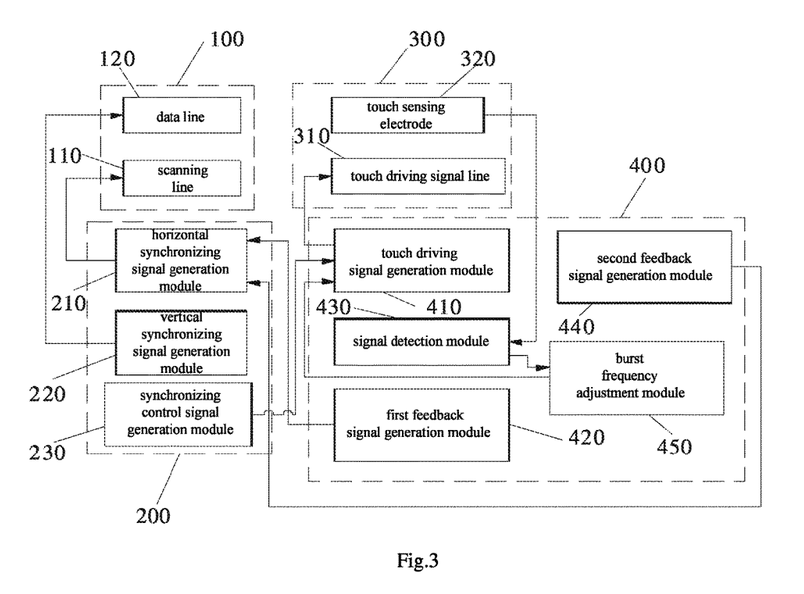
FIG. 3 is schematic view showing modules of a display device provided in the present disclosure.
Figure 5:
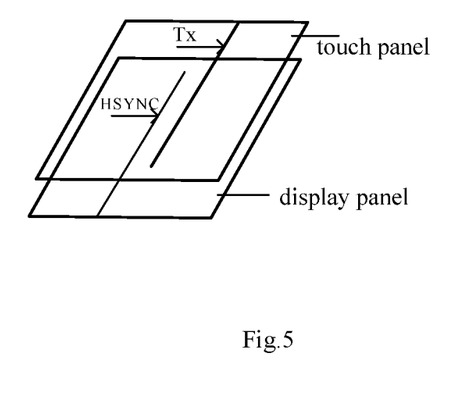
FIG. 5 is a schematic view of a display device according to the principals of the present disclosure.

A display device is provided according to another aspect of the present disclosure, and the display device may be driven by the method hereinabove. As shown in FIG. 3, the display device includes a display panel 100, a touch panel 300, a display panel driving circuit 200 and a touch panel driving circuit 400. The display panel 100 includes a plurality of scanning lines 110. The touch panel 300 includes a plurality of touch driving signal lines 310. The display panel driving circuit 200 includes a horizontal synchronizing signal generation module 210 configured to apply a horizontal synchronizing signal HSYNC to the plurality of scanning lines 110 in sequence. The touch panel driving circuit 400 includes a touch driving signal generation module 410 configured to apply a touch driving signal Tx to the plurality of touch driving signal lines 310. The horizontal synchronizing signal HSYNC provided by the display panel driving circuit 200 and the touch driving signal Tx provided by the touch panel driving circuit 400 satisfy the following conditions: at least within a predetermined time period, an orthographic projection of the scanning line 110 receiving the horizontal synchronizing signal HSYNC onto the display panel 100 does not overlap an orthographic projection of the touch driving signal line 310 receiving the touch driving signal Tx onto the display panel 100 (as shown schematically in FIG. 5).

As described hereinabove, at least within the predetermined time period, the scanning line 110 receiving the horizontal synchronizing signal HSYNC and the touch driving signal line 310 receiving the touch driving signal Tx are staggered, whereby a coupled capacitance between the scanning line 110 and the touch driving signal line 310 may be reduced, and a signal-noise ratio of the touch panel 300 may be improved, thereby a location coordinate of a touch point may be determined accurately.

To improve the signal-noise ratio of the touch panel 300 in an entire displaying process, optionally, the horizontal synchronizing signal HSYNC provided by the display panel driving circuit 200 and the touch driving signal Tx provided by the touch panel driving circuit 400 satisfy the following conditions: at any time, the orthographic projection of the scanning line 110 receiving the horizontal synchronizing signal HSYNC onto the display panel 100 does not overlap the orthographic projection of the touch driving signal line 310 receiving the touch driving signal Tx onto the display panel 100.

As described hereinabove, a width of the touch driving signal line 310 is optionally an integral multiple of a pixel width of the display panel 100 according to the display device provided in the present disclosure, so as to save the manufacturing cost. It may be understood that, the touch driving signal line 310 may be made of transparent electrode material.

Figure 4:
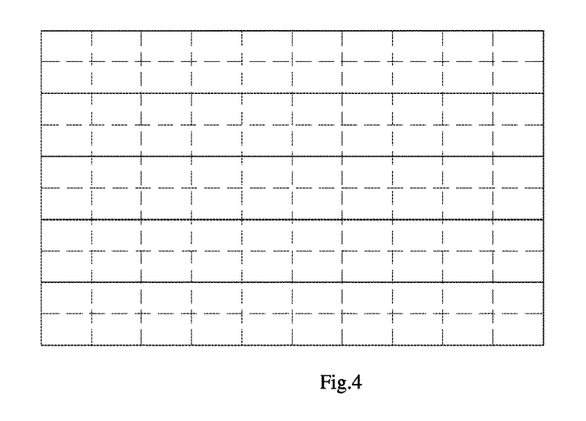
FIG. 4 is a schematic view showing a relationship between width of touch driving signal lines and width of pixels.

FIG. 4 is a schematic view showing a relationship between the width of touch driving signal lines and width of pixels. The solid line represents a profile of the touch driving signal line 310, and the dotted line represents a profile of a pixel unit. As shown in FIG. 4, the width of each touch driving signal line 310 is two times of the width of each row of pixels. Obviously, FIG. 4 is merely to express that the touch driving signal line 310 is wider than the pixel, which does not represent that the touch driving signal line 310 may only be made twice as wide as a row of pixels in a practical process of manufacturing the display device. As described hereinabove, the width of the touch driving signal line 310 may be 107 times of the width of pixel unit in a display device with a resolution of 1280×720.

It may be understood that, the display panel 100 includes a plurality of data lines 120, and the display panel driving circuit 200 further includes a vertical synchronizing signal generation module 220 configured to apply a vertical synchronizing signal VSYNC to the data lines 120. One data line 120 receiving the vertical synchronizing signal VSYNC means a beginning of one frame of image.

As described hereinabove, the touch driving signal Tx and the horizontal synchronizing signal HSYNC are generated simultaneously. To this end, the display panel driving circuit 200 may further include a synchronizing control signal generation module 230 configured to apply a synchronization control signal SYNC to the touch driving signal generation module 410 of the touch panel driving circuit 400. When displaying one frame of image, the synchronizing control signal generation module 230 applies the synchronization control signal SYNC to the touch driving signal generation module 210 applies the horizontal synchronizing signal HSYNC to the first scanning line 110. The touch driving signal generation module 410 generates the touch driving signal Tx when receiving the synchronization control signal SYNC. The synchronization control signal SYNC and a first horizontal synchronizing signal HSYNC when displaying the frame of image are generated synchronously, thereby facilitating controlling the time sequences of the scanning signal and the touch driving signal Tx.

To eliminate an influence of a liquid crystal capacitance of the display panel 100 to the touch panel 300, optionally, the horizontal synchronizing signal generation module 210 may stop applying the horizontal synchronizing signal HSYNC to the plurality of scanning lines 110 of the display panel 100 at a predetermined time point before completion of displaying the frame of image; and the touch driving signal generation module 410 may stop applying the touch driving signal Tx to the plurality of touch driving signal lines 310 of the touch panel 300 at the predetermined time point before completion of displaying the frame of image. The touch panel 300 further includes a noise monitoring module (not shown) configured to monitor noise of the display panel 100. The noise of the display panel 100 herein refers to influence of the liquid crystal capacitance of the display panel 100 to a signal induced in a touch sensing electrode 320 of the touch panel 300.

According to the present disclosure, the influence of the liquid crystal capacitance to the touch sensing electrode 320 of the touch panel 300 may be eliminated in several ways, and the noise monitoring module may be of several types.

According to one embodiment of the present disclosure, optionally, the noise monitoring module includes a touch sensing electrode 320; the touch panel driving circuit 400 further includes a signal monitoring module 430; the touch sensing electrode 320 is connected to the signal monitoring module 430; the touch sensing electrode 320 and the touch driving signal line 310 forms a capacitor; the signal monitoring module 430 is connected to the touch sensing electrode 320, to monitor variation of a signal output by the touch sensing electrode 320.

It may be understood that, the touch sensing electrode 320 of the noise monitoring module is the touch sensing electrode 320 of the touch panel 300. In addition to monitor the noise, the touch sensing electrode 320 is further configured to monitor variation of a capacitance caused between the touch sensing electrode 320 and the touch driving signal line 310 when a hand touches the touch panel 300. To make the touch sensing electrode 320 be a part of the noise monitoring module is conductive to simplify a structure of the display device.

As described hereinabove, a time period for displaying one frame of image is divided into two parts: one is a time period for displaying, and the other is a time period for monitoring noise. To guarantee that the applying of the touch driving signal Tx, the horizontal synchronizing signal HSYNC and the vertical synchronizing signal VSYNC may be stopped simultaneously, optionally, the touch panel driving circuit 400 may further include a first feedback signal generation module 420. The first feedback signal generation module 420 may send a first feedback signal TEND1 to the display panel driving circuit 200 (specifically, the horizontal synchronizing signal generation module 210 of the display panel driving circuit 200) when the touch panel driving circuit 400 stops applying the touch driving signal Tx to the plurality of touch driving signal lines 310. The display panel driving circuit 200 (specifically, the horizontal synchronizing signal generation module 210 of the display panel driving circuit 200) may stop outputting the horizontal synchronizing signal HSYNC when receiving the first feedback signal TEND1.

As described hereinabove, the purpose of monitoring the noise caused by the liquid crystal capacitance of the display panel 100 is to reduce or even eliminated the influence of the liquid crystal capacitance to the touch panel 300. The way how to reduce or even eliminate the influence of the liquid crystal capacitance to the touch panel 300 may be described in details hereinafter. To this end, the touch driving signal Tx of the touch panel driving circuit 400 may be adjusted by means of frequency hopping. To be specific, the touch panel driving circuit 400 further includes a burst frequency adjustment module 450. The burst frequency adjustment module 450 may receive a monitoring result obtained by the noise monitoring module, and the burst frequency adjustment module 450 is configured to adjust the burst frequency of the touch driving signal Tx, until the touch driving signal Tx avoids the noise. According to the present disclosure, the monitoring result obtained by the noise monitoring module may be acquired by the signal monitoring module 430, and the monitoring result may be sent to the burst frequency adjustment module 450 by the signal monitoring module 430.

After displaying one frame of image, the display device may display a next frame of image so as to display continuous images. To realize continuously displaying of images, optionally, the touch panel driving circuit 400 may further includes a second feedback signal generation module 440. The second feedback signal generation module 440 is configured to send a second feedback signal TEND2 to the display panel driving circuit 200 (specifically, the horizontal synchronizing signal generation module 210 of the display panel driving circuit 200) when the displaying of one fame of image is completed. The display panel driving circuit 200 (specifically, the horizontal synchronizing signal generation module 210 of the display panel driving circuit 200) may control the horizontal synchronizing signal generation module 210 to continue to send the horizontal synchronizing signal HSYNC after receiving the second feedback signal TEND2.

It may be understood that, the above embodiments are merely the exemplary embodiments for illustrating a principle of the present disclosure, but the present disclosure is not limited thereto. Those skilled in the art may make various modifications and improvements without departing from the spirit and essence of the present disclosure, and these modifications and improvements may also fall into the scope of the present disclosure.

What is claimed is:

1. A method for driving a display device that includes a display panel and a touch panel, the method comprising:
   applying a horizontal synchronizing signal to a plurality of scanning lines of the display panel;
   applying a touch driving signal to a plurality of touch driving signal lines of the touch panel, wherein, at least within a predetermined time period, an orthographic projection of the scanning line receiving the horizontal synchronizing signal onto the display panel does not overlap an orthographic projection of the touch driving signal line receiving the touch driving signal onto the display panel by scanning an (M+1)th row of the touch driving signal line first and then scanning an Mth row of the touch driving signal line in a case that the Mth row of the touch driving signal line to be scanned covers a scanning line which is being scanned;
   stopping the step of applying the horizontal synchronizing signal to the plurality of scanning lines of the display panel and stopping the step of applying the touch driving signal to the plurality of touch driving signal lines of the touch panel at a predetermined time point before completion of displaying one frame of image; and
   monitoring noise of the display panel in response to stopping the step of applying the horizontal synchronizing signal to the plurality of scanning lines of the display panel and stopping the step of applying the touch driving signal to the plurality of touch driving signal lines of the touch panel at a predetermined time point before completion of displaying one frame of image.

2. The method according to claim 1, wherein the orthographic projection of the scanning line receiving the horizontal synchronizing signal onto the display panel does not overlap the orthographic projection of the touch driving signal line receiving the touch driving signal onto the display panel at any time.

3. The method according to claim 1, wherein a frequency of the touch driving signal is greater than a frequency of the horizontal synchronizing signal.

4. The method according to claim 1, wherein the step of applying the horizontal synchronizing signal to the plurality of scanning lines of the display panel and the step of applying the touch driving signal to the plurality of touch driving signal lines of the touch panel are performed simultaneously.

5. The method according to claim 1, further comprising:
   adjusting a burst frequency of the touch driving signal based on the noise of the display panel obtained in the step of monitoring the noise of the display panel, until the touch driving signal avoids the noise.

6. The method according to claim 1, further comprising:
   scanning the touch driving signal lines from an $N^{th}$ row to a last row of the touch driving signal line, and then scanning the touch driving signal lines from a first row to an $(N-1)^{th}$ row of the touch driving signal line, where N is greater than 1.

7. The method according to claim 1, further comprising:
   applying a vertical synchronizing signal to a plurality of data lines of the display panel when applying the horizontal synchronizing signal to a first scanning line of the display panel; and
   applying a synchronization control signal to a touch panel driving circuit of the touch panel when applying the horizontal synchronizing signal to the first scanning line of the display panel,
   wherein the touch driving signal is applied to the plurality of touch driving signal lines of the touch panel when the touch panel driving circuit of the touch panel receives the synchronization control signal.

8. The method according to claim 1, wherein a width of the touch driving signal line is an integral multiple of a pixel width of the display panel, and the width of the touch driving signal line is determined by a resolution of the display panel.

9. The method according to claim 8, wherein the width of the touch driving signal line is 107 times the pixel width of the display panel for the display panel with the resolution of 1280 by 720 pixels.

10. A display device, comprising:
a display panel;
a touch panel;
a display panel driving circuit; and
a touch panel driving circuit,
wherein:
the display panel comprises a plurality of scanning lines,
the touch panel comprises a plurality of touch driving signal lines,
the display panel driving circuit comprises a horizontal synchronizing signal generation module configured to apply a horizontal synchronizing signal to the plurality of scanning lines in sequence,
the touch panel driving circuit comprises a touch driving signal generation module configured to apply a touch driving signal to the plurality of touch driving signal lines,
by scanning an (M+1)th row of the touch driving signal line first and then scanning an Mth row of the touch driving signal line in a case that the Mth row of the touch driving signal line to be scanned covers a scanning line which is being scanned, the horizontal synchronizing signal provided by the display panel driving circuit and the touch driving signal provided by the touch panel driving circuit satisfy the following condition:
at least within a predetermined time period, an orthographic projection of the scanning line receiving the horizontal synchronizing signal onto the display panel does not overlap an orthographic projection of the touch driving signal line receiving the touch driving signal onto the display panel,
the horizontal synchronizing signal generation module stops applying the horizontal synchronizing signal to the plurality of scanning lines of the display panel at a predetermined time point before completion of displaying one frame of image,
the touch driving signal generation module stops applying the touch driving signal to the plurality of touch driving signal lines of the touch panel at the predetermined time point before completion of displaying one frame of image, and
the touch panel further comprises a noise monitoring module configured to monitor noise of the display panel in response to the horizontal synchronizing signal generation module stopping the application of the horizontal synchronizing signal to the plurality of scanning lines of the display panel and the touch driving signal generation module stopping the application of the touch driving signal to the plurality of touch driving signal lines of the touch panel at a predetermined time point before completion of displaying one frame of image.

11. The display device according to claim 10, wherein the horizontal synchronizing signal provided by the display panel driving circuit and the touch driving signal provided by the touch panel driving circuit further satisfy the following condition:
the orthographic projection of the scanning line receiving the horizontal synchronizing signal onto the display panel does not overlap the orthographic projection of the touch driving signal line receiving the touch driving signal onto the display panel at any time.

12. The display device according to claim 10, wherein a width of the touch driving signal line is an integral multiple of a pixel width of the display panel.

13. The display device according to claim 10, wherein:
the display panel comprises a plurality of data lines,
the display panel driving circuit further comprises a vertical synchronizing signal generation module and a synchronizing control signal generation module,
the vertical synchronizing signal generation module is configured to apply a vertical synchronizing signal to the data lines,
the synchronizing control signal generation module is configured to apply, when displaying one frame of image, a synchronization control signal to the touch driving signal generation module of the touch panel driving circuit when the horizontal synchronizing signal generation module applies the horizontal synchronizing signal to a first scanning line, and
the touch driving signal generation module generates the touch driving signal when receiving the synchronization control signal.

14. The display device according to claim 10, wherein:
the touch panel driving circuit further comprises a first feedback signal generation module,
the first feedback signal generation module sends a first feedback signal to the display panel driving circuit when the touch panel driving circuit stops applying the touch driving signal to the plurality of touch driving signal lines, and
the display panel driving circuit stops outputting the horizontal synchronizing signal when the display panel driving circuit receives the first feedback signal.

15. The display device according to claim 10, wherein:
the noise monitoring module comprises a touch sensing electrode,
the touch panel driving circuit further comprises a signal monitoring module,
the touch sensing electrode is connected to the signal monitoring module,
the touch sensing electrode and the touch driving signal line form a capacitor, and
the signal monitoring module is connected to the touch sensing electrode to monitor variation of a signal output by the touch sensing electrode.

16. The display device according to claim 10, wherein:
the touch panel driving circuit further comprises a burst frequency adjustment module,
the burst frequency adjustment module receives a monitoring result obtained by the noise monitoring module, and
the burst frequency adjustment module is configured to adjust a burst frequency of the touch driving signal until the touch driving signal avoids the noise.

17. The display device according to claim 10, wherein:
the touch panel driving circuit further comprises a second feedback signal generation module,
the second feedback signal generation module is configured to send a second feedback signal to the display panel driving circuit when displaying of one fame of image is completed, and
the display panel driving circuit controls the horizontal synchronizing signal generation module to continue to send the horizontal synchronizing signal after the display panel driving circuit receives the second feedback signal.

* * * * *